Nov. 6, 1951   B. B. BURCKHALTER   2,573,831
ROTARY FLUID BRAKE
Filed Nov. 2, 1949   4 Sheets-Sheet 1
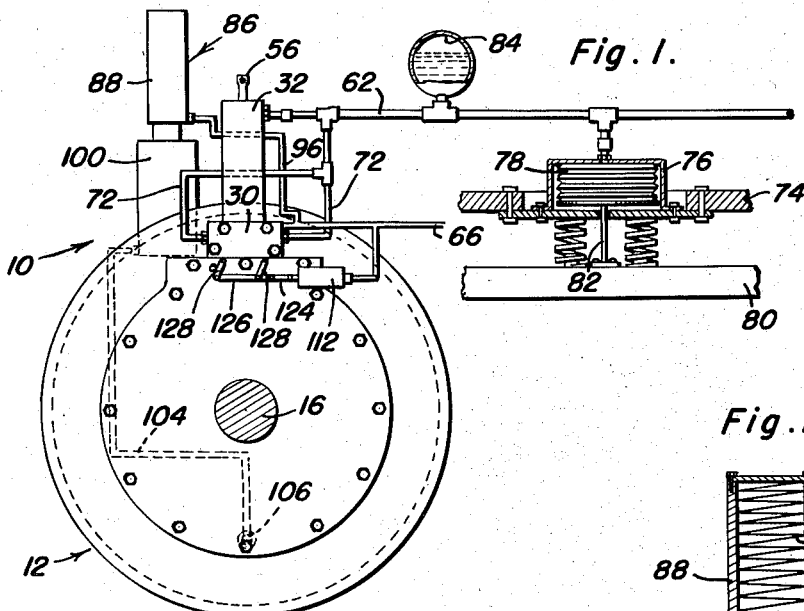
Fig. I.
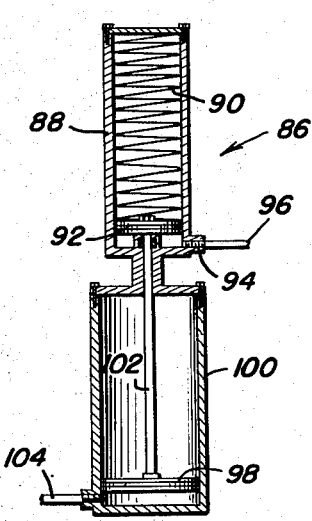
Fig. II.
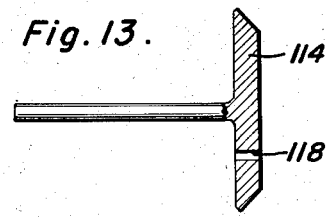
Fig. 13.
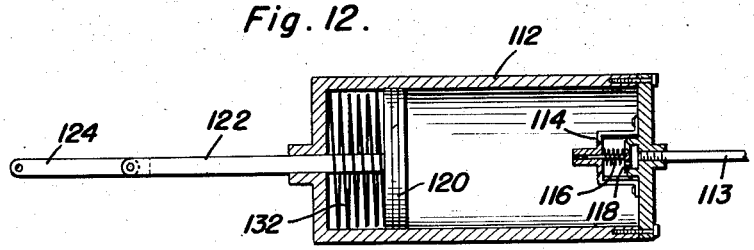
Fig. 12.
Inventor
Burton B. Burckhalter
By *Clarence A. O'Brien and Harvey B. Jacobson*
Attorneys Inventor
Burton B. Burckhalter Nov. 6, 1951     B. B. BURCKHALTER     2,573,831
ROTARY FLUID BRAKE Filed Nov. 2, 1949     4 Sheets-Sheet 3

Inventor

Burton B. Burckhalter

By *Clarence A. O'Brien*
and *Harvey B. Jacobson*
Attorneys

Nov. 6, 1951

B. B. BURCKHALTER 2,573,831

ROTARY FLUID BRAKE

Filed Nov. 2, 1949

Inventor

Burton B. Burckhalter

By *Clarence A. O'Brien and Harvey B. Jacobson*
Attorneys

Patented Nov. 6, 1951

2,573,831

UNITED STATES PATENT OFFICE 2,573,831

ROTARY FLUID BRAKE

Burton B. Burckhalter, Clifton, Colo.

Application November 2, 1949, Serial No. 125,018

7 Claims. (Cl. 188—90)

This invention relates to new and useful improvements in brakes and the primary object of the present invention is to provide an anti-friction air operated brake for the wheel supporting axles of railway cars.

Another object of the present invention is to provide a fluid brake that can be used with the present standard railroad equipment with no additional or special connections or the like, thereby permitting the instant brake to be utilized without demanding a general conversion from the presently used type of brake.

Yet another object of the present invention is to provide a fluid brake that is so constructed as to permit the same to be used with all types of railway cars giving equal braking power to each car regardless of the load carried by such cars.

Another object of the present invention is to provide a brake that will act upon the wheel supporting axle of a car rather than the wheel thereby eliminating undue wear and damage to the wheels and brake mechanism.

Another object of the present invention is to provide a fluid brake that depends upon a resilient member for its operation so that any time the air pressure is reduced the brakes will be urged to their braking position until they are released by hand or air pressure.

Another object of the present invention is to provide a fluid brake that is extremely efficient and safe in operation as the same will not leak off to release the brakes which is the cause of many accidents. Also, in operating the brakes down a grade, they do not have to be released and recharged.

Another feature of the present invention is to provide a fluid brake for the wheel supporting axles of railroad cars that is applied to the brake line of a railroad car so that as soon as there is enough air in the brake line to release the brakes the car is ready to be moved without danger due to lack of brakes.

Another feature of the present invention is to provide a non-friction brake working on the axle to obviate the possibility of hot wheels and which is so constructed as to prevent the wheels from locking to cause flat spots on the wheels. This latest feature lessens the cost of maintenance considerably.

Another feature of the present invention is to provide a fluid brake for the wheel supporting axles of railway cars that will arrest the rotation of the axles and wheels without effecting appreciable sound and wear.

A further object of the present invention is to provide a brake of the aforementioned character that embodies a novel and improved locking means actuated by the brake line of a railway car to lock the wheels of the railway car.

A still further aim of the present invention is to provide a hydraulically operated axle brake that is small and compact in structure, strong and reliable in use, simple and practical in construction, relatively inexpensive to manufacture, install and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic view showing the present fluid brake, the means for locking the brake to hold the wheels of standing cars against rotation, and the load responsive operating means for actuating the bellows which adjust the valve members housed in the stator;

Figure 11 is a vertical sectional view of the pressure reducer that is utilized with the present fluid brake;

Figure 12 is a vertical sectional view of the by-pass valve operator that is employed with the instant brake;

Figure 13 is an enlarged view of the valve member used with the by-pass valve operator, and with parts thereof broken away; and, Figure 14 is a vertical sectional view of the bellows used in conjunction with the present invention and more particularly the bellows employed for adjusting the resilient member acting upon the gate operating plunger.

Figure 2:
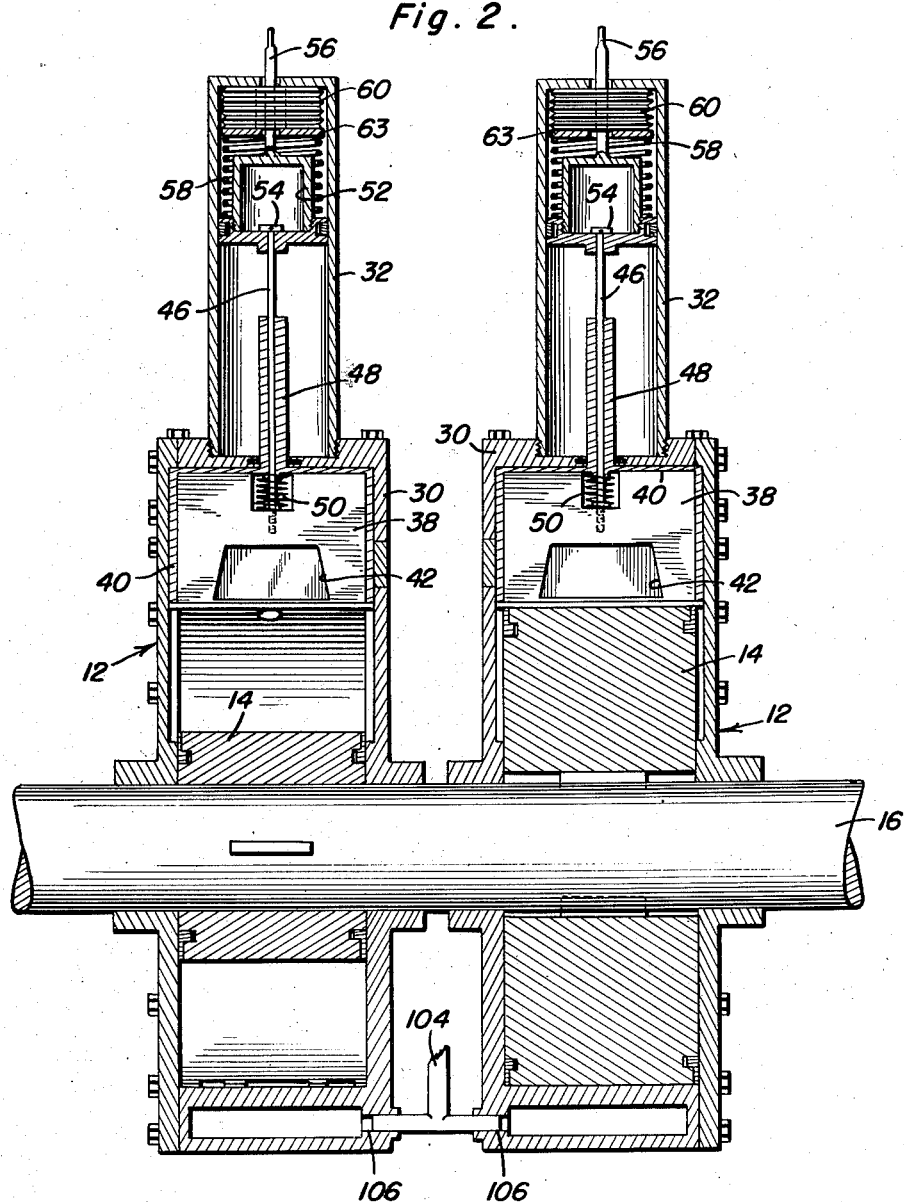
Figure 2 is a view partly in section and partly in elevation of the complementary stators and rotors applied to a wheel supporting axle.
Figure 14:
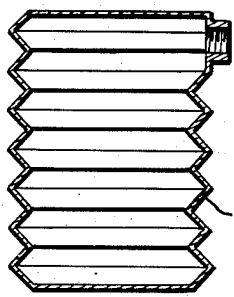
Figure 3:
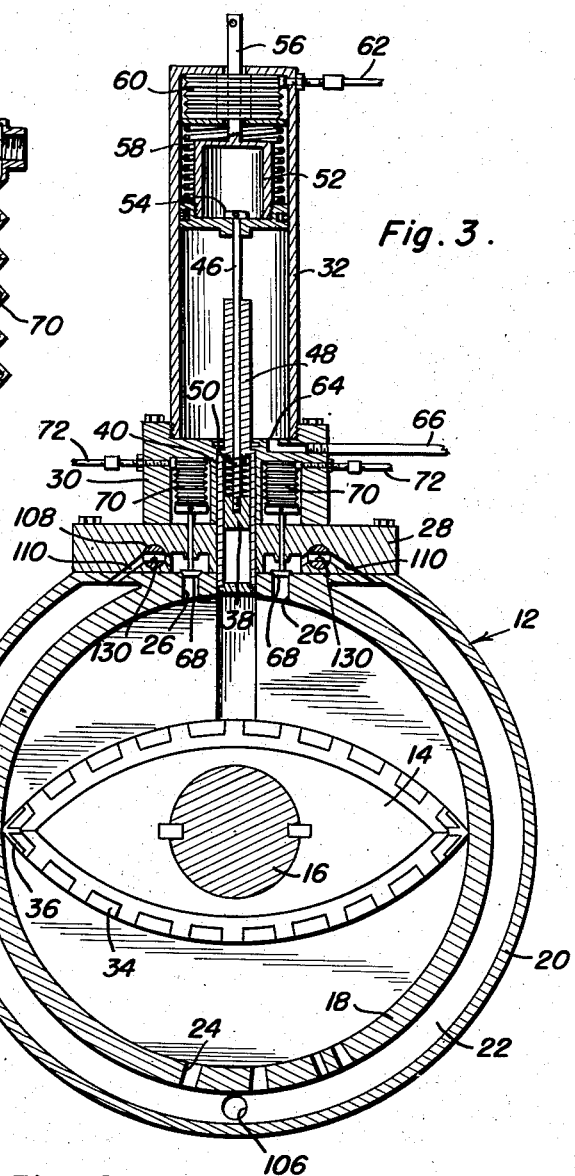
Figure 3 is a vertical sectional view of one of the stators, showing the rotor in elevation, and illustrating the gate operating plunger in its raised position and the by-pass valves in their open position.

Referring now to the drawings in detail, wherein for the purpose of illustration, there is disclosed a preferred embodiment of the present invention, the numeral 10 represents the brake unit which includes a stator 12 and rotor 14. A plurality of such units 10 are applied to each wheel supporting axle 16 and the rotor 14 of one unit is keyed to the axle and set at 90° to the rotor 14 of another unit which is also keyed to the axle.

The brake used at present on standard railroad equipment is operated by increasing and decreasing the air pressure in the brake line and the instant brake operates on the same principle, however, the entire working system and safety features of the instant brake differ considerably from that of the brake now utilized on railroad equipment.

The now employed railroad brake consists broadly of a cylinder and a piston slidably received in the cylinder. Air is forced into the cylinder on both sides of the piston in an operation commonly referred to as "charging the brakes." When the pressure is reduced in the brake line to apply the brakes, a reduction in pressure in one end of the charged cylinder occurs and the pressure in the other end of the cylinder remains the same, causing the piston to move toward the end of the cylinder in which the pressure was reduced thereby moving a system of rods and levers so as to cause an iron brake shoe to press against the outer circumference of each wheel. The pressure of the brake shoe against the wheel causes friction and thereby exerts a braking power.

The friction occurring between the brake shoe and wheel causes much heat and if continued for an extended period can result in damage to both the wheels and the brake mechanism. Also, the air pressure leaks out of the high pressure side of the cylinder in a short time when brakes are in their "set up" position and pressure must be increased in the train line, thus releasing the brakes to recharge the brake cylinder. This sometimes occurs on a long grade and it is difficult to keep a heavy train under control. Also, cars left standing on a slight grade oftentimes "leak off" (pressure reduced in cylinders), thus releasing the brakes causing run away cars unless hand brakes are set.

The instant brake is so constructed as to eliminate the above undesirable occurrences and to provide an extremely safe and highly efficient brake that can be operated in a convenient manner.

Stator

The stator 12 consists of a preferably annular or cylindrical housing having spaced inner and outer circular walls 18 and 20 to provide a fluid passage 22. The lower portion of the inner wall 18 is provided with a plurality of inlet openings 24 and the upper part of the inner wall 18 is formed with a pair of spaced parallel outlet openings 26 that communicate with the passage 22 and the chamber defined by the inner wall 18.

The upper periphery of the stator 12 is relatively flat or straight and supports a casing consisting of a base 28, a socket member 30 and a tubular member 32. The socket member 30 is provided with an internally threaded recess in its upper face that receivably engages the lower threaded end of the tubular member 32 and the base 28 and socket member 30 are detachably secured together and to the stator by any suitable means, such as fastening bolts.

Rotor

The rotor 14 is keyed to the axle 16 and is provided seal rings 34 and 36. The rotor 14 is received within the inner circular 18 and the rotor is elliptical in cross section. As aforementioned, a plurality of stators and a plurality of rotors are associated with each wheel supporting axle and the stators are spaced at a suitable, predetermined distance from each other. The rotors are placed at equal angles from each other as such an arrangement has proven to be the most efficient.

Arresting mechanism for rotor

Figure 8:
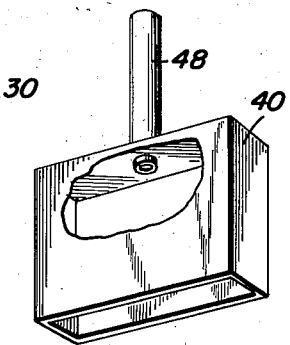
Figure 8 is a perspective view of the main gate, and with parts broken away for the convenience of explanation.
Figure 5:
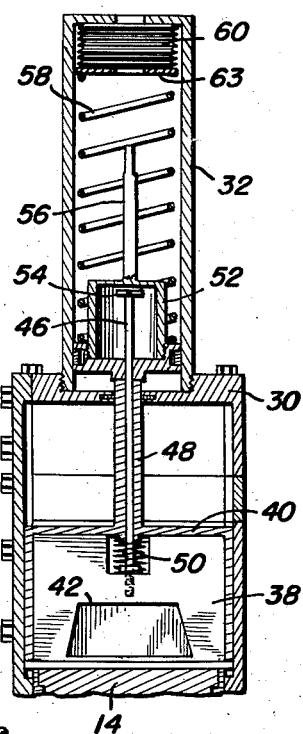
Figure 5 is a view similar to Figure 4, but showing the plunger forcing the main gate into the housing for the rotor to block the opening in the partial gate.
Figure 6:
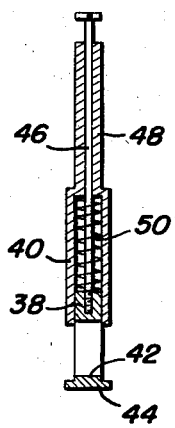
Figure 6 is a vertical sectional view of the valve member, consisting of a partial gate and main gate, that is employed for arresting rotation of the rotor, the partial gate being spaced from the main gate.
Figure 7:
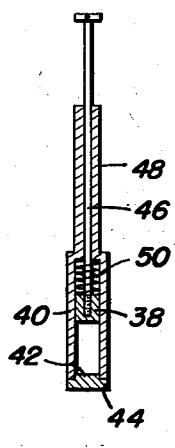
Figure 7 is a view similar to Figure 6 and showing the main gate closing the opening in the partial gate.
Figure 9:
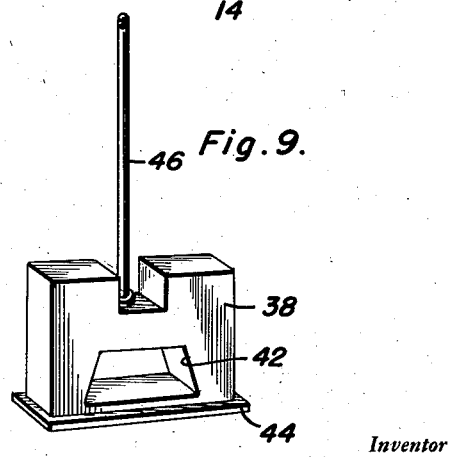
Figure 9 is a perspective view of the partial gate.

Means is provided for arresting rotation of the rotor. This means consists of a valve member including a partial gate 38 (Figure 9) and a main gate 40 (Figure 8). The partial gate 38 is slidably received in radial grooves 39 provided in the walls of the stator 12 and is provided with an opening 42 and a lower flanged portion 44. The main gate 40 is hollow and includes an open bottom that slidably receives the partial gate 38. The flanged portion 44 will limit the sliding movement of the partial gate into the main gate and the ends of the flanged portion 44 are also slidably received in the grooves 39. The grooves 39 are sealed to prevent leakage of fluid between sides of rotor and stator.

A connecting and guiding rod 46 is secured to and rising from the partial gate 38 is slidably received in a tubular post 48 rising from the main gate 40. A coil spring 50 surrounds the rod 46 and is biased between the upper wall of the partial gate 38 and the upper wall of the main gate 40 to yieldingly urge the partial gate from the main gate.

The base 28 and the socket member 30 are provided with registering openings that slidably receive the main gate 40 and the post 48 extends into the tubular member 32. The main gate is movable from its position within the base 28 and the socket member 30 into the chamber defined by the inner wall 18 for arresting the rotation of the rotor 14.

Operating means for the main gate and the partial gate

Means is provided for moving the main gate 40 and the partial gate 38 into and on top of the stator or the chamber defined by the inner circular wall 18. This means comprises a hollow plunger 52 that is slidably received in the tubular member 32. The lower wall of the plunger is formed with a central opening that receives the rod 46 and a stop or abutment 54 on the rod 46 will contact the inner surface of the lower wall of the plunger to limit the movement of the partial gate away from the plunger.

A bar 56 rises from the plunger 52 and is slidably received by the upper wall of the tubular member 32. The bar 56 is connected to any suitable manually operated linkage whereby the plunger may be moved from the rotor 14.

A resilient member or coil spring 58 acts upon the plunger 52 and yieldingly urges the plunger toward the rotor 14 so that as the plunger moves toward the rotor, the partial gate 38 will be moved by the spring 50 into the stator. Upon continued movement of the plunger 52 toward the rotor, the plunger will engage the post 48 to also urge the main gate 40 into the stator to block the opening 42 in the partial gate.

Adjusting means for resilient plunger-urging member

A bellows 60 is received in the upper end of the tubular member 32 and includes a combined inlet and outlet nipple that is connected to a fluid pressure line 62. A plate 63, movable by the bellows 60, is placed between the bellows 60 and the upper end of the coil spring 58.

Plunger lifting means

The socket member 30 is provided with a passage 64 that enters the lower end of the tubular member 32. The passage 64 is connected to the train brake line 66 so that as pressure in the tubular member is increased, the plunger 52 will be lifted and the partial gate 38 and the main gate 40 will be urged out of the stator 12.

Valve control for outlet openings in the inner wall of stator

Check valves 68 control the flow of fluid from the chamber defined by the wall 18, the fluid acted upon by the rotor 14, into the passage 22. When the instant brake is fully set up or enough pressure is exerted on the fluid within the wall 18 to force it through the openings 26, the fluid will lift the valves 68 to pass into the passage 22. The fluid in the passage 22 will reenter the chamber defined by the wall 18 through the openings 24.

Adjusting means for check valves

The by-pass valves or check valves 68 are variably adjusted by pressure pads or bellows 70 which are received in recesses in the socket member 30. The bellows 70 are provided with combined inlet and outlet nipples that are connected to lines 72. The lines 72 branch from the aforementioned fluid pressure line 62.

Load responsive control for bellows

The bellows 60 and 70 are expanded and contracted as a result of fluid pressure entering the same through the lines 62 and 72. The pressure in the lines 62 and 72 is controlled directly relative to the weight of the car and the load carried by the car so as to prevent locking of the wheels as the brake is applied. As shown in Figure 1, there is provided a spring supported member 74 part of the car that carries a housing 76 for a bellows 78. The support 80 (a part of the car) holds a member 82 that will compress the bellows 78 as the member 74 moves downwardly toward the support 80. The housing 76 is joined by a pipe to the line 62 so that as the bellows 78 is compressed fluid will be forced through the line 62 to cause an expansion of the bellows 60 and 70.

The line 62 is also joined to a load varying pressure tank 84 and the pressure may be adjusted by shortening or lengthening rod 82 thereby controlling the extent the bellows 78 are compressed.

Pressure reducer for fluid pressure in stator

A small amount of pressure is developed by centrifugal force within the stator 12, by movement of the fluid impelled by the rotor. This fluid pressure is overcome by a forced feed device 86 shown best in Figure 11 of the drawings. The forced feed device is placed at any convenient point on each piece of equipment and may be of such a size and so arranged that a single unit would serve for all brake units on that individual piece of equipment. Or circumstances may require an individual force feed unit for each brake unit or pair of brake units.

The forced feed device is composed of an air cylinder 88 in which there is received a coil spring 90 that acts upon a first piston 92. Air pressure enters the lower portion of the cylinder 88 through a nipple 94 connected to a pipe 96 branching from the train brake line 66 and pushes upwardly upon a lower piston 98 received in a lower brake fluid receiving cylinder 100. The pistons 92 and 98 are mounted on a common piston rod 102.

The piston 98 is a double acting piston that draws the fluid into the cylinder 100 as air pressure is increased in the upper cylinder 88. This increase in air pressure occurs when releasing the brakes and draws most of the fluid from the brakes thus lessening the resistance and allowing the wheels to turn more freely.

When the brakes are applied by reducing air pressure, fluid is forced from the cylinder 100 by piston 98 through pipe 104 and enters the brake units through a port 106 in the stator. The fluid is forced from the cylinder 100 due to the action of the spring 90.

Means for locking the wheels of standing cars

Figure 10:
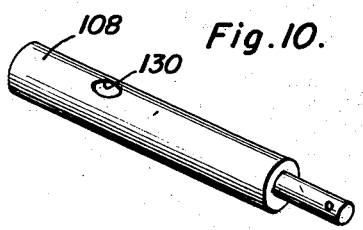
Figure 10 is a perspective view of one of the by-pass valves that is used in conjunction with the present invention.
Figure 4:
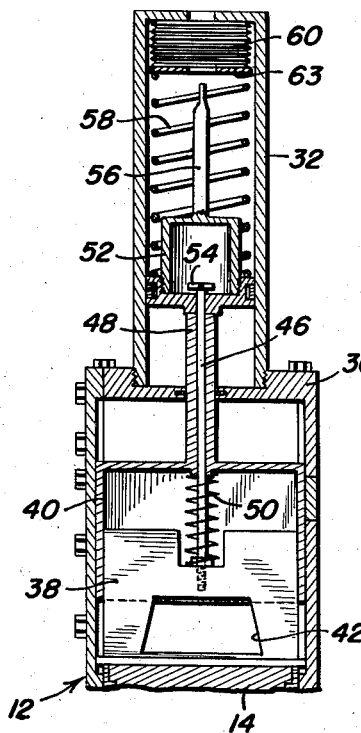
Figure 4 is a fragmentary vertical erectional view of one of the stators showing the gate operating plunger moved slightly and the partial gate urged into the housing for the rotor.

An added feature of safety and efficiency is the by-pass shut valves 108. The object of this feature is to lock the wheels of standing cars. The valves 108 are cylindrical in shape (see Figure 10) and are rotatably mounted in apertures provided in the base 28 to control the flow of fluid from the openings 26 into the passage 22 by way of passages or channels 110 in the base 28. The valves 108 are operated as are the brakes by the increasing and decreasing of air pressure in the train line 66 which is connected to cylinder 112 (supported on the stator 12). The air pressure enters cylinder 112 by pushing against a valve 114 which is held in its closed position by a light spring 116. A very small vent or hole 118 is provided in the valve 114 through which the compressed air in cylinder 112 can slowly return (about two minutes required) to the train line 66 when pressure is sufficiently reduced (less than 25 pounds pressure) in same.

The pressure in the cylinder 112 entering line 113 that is connected to line 66 pushes against a piston 120 which in turn moves a piston rod 122 and connecting rods 124 and 126. The rods 124 and 126 move levers 128 so as to turn valves 108, whereby the ports 130 in the valves 108 register with the exhaust channels 110 permitting the flow of fluid, by-passing through valves 68 to enter passage 22.

As the air pressure is reduced in the train line 66 sufficiently, spring 132, acting on piston 120, slowly urges the piston 120 and piston rod 122, as well as connecting rods 124 and 126, toward cylinder 112 thereby moving levers 128 so that valves 108 are closed against any flow of fluid in channels 110, thereby preventing the turning of axle 16.

Suitable pressure seals are provided in the brake assembly to prevent the escape of pressure from around and within tube 48 between cylinder 32 and the chamber which houses the gate 40.

Having described the invention, what is claimed as new is:

1. In combination with a wheel axle and the brake line of a train, a fluid brake comprising a rotary member keyed to the axle, a housing for the rotary member, a casing carried by the housing, a partial gate slidably received in the casing and movable into and out of the housing, a plunger slidably mounted on the casing held raised by air pressure entering the casing through the brake line, said plunger being connected to said partial gate to hold the latter raised when the plunger is raised, means for urging the partial gate into the housing upon a reduction of air pressure in the casing, said partial gate having an opening therein, and a gate operated by the plunger upon a reduction of air pressure in the casing for closing the opening in said partial gate.

2. The combination of claim 1 wherein said housing includes spaced inner and outer circular walls, said inner walls having inlet and outlet openings therein, a valve controlling the flow of fluid through the outlet opening into the space between the inner and outer walls, and an operating means for said valve.

3. The combination of claim 2 wherein said operating means includes a bellows housed in said casing, and means for expanding said bellows.

4. The combination of claim 3 wherein said means for expanding said bellows includes a fluid pressure line connected to said bellows, and a further bellows for forcing fluid through said fluid pressure line and into said first mentioned bellows.

5. For use with a wheel axle and the brake line of a train, a fluid brake comprising a rotary member keyed on the axle, a housing for the rotary member including spaced inner and outer circular walls to provide a by-pass passage between said inner and outer walls, said inner wall having inlet and outlet openings therein, a valve controlling the flow of fluid through the outlet opening in said inner wall, adjustable means for limiting opening movement of said valve, means for arresting rotation of said rotary member, operating means actuated by the brake line for activating said arresting means, and further means operated by the brake line for locking the rotary member against rotation, said arresting means including a valve member movable into and out of said housing, said valve member including a partial gate having an opening therein and a hollow gate slidably receiving said partial gate and adapted to close the opening in said partial gate.

6. For use with a wheel axle and the brake line of a train, a fluid brake comprising a rotary member keyed on the axle, a housing for the rotary member including spaced inner and outer circular walls to provide a by-pass passage between said inner and outer walls, said inner wall having inlet and outlet openings therein, a valve controlling the flow of fluid through the outlet opening in said inner wall, adjustable means for limiting opening movement of said valve, means for arresting rotation of said rotary member, operating means actuated by the brake line for activating said means for arresting rotation of said rotary member, and further means operated by the brake line for locking the rotary member against rotation, said operating means including a casing carried by said housing, a plunger slidably received in said casing, resilient means urging said plunger toward said housing, and means for adjusting the tension of said resilient means, said means for adjusting the tension of said resilient means including a bellows acting upon said resilient means, and a load responsive system for expanding said bellows.

7. The combination of claim 6 wherein said load responsive system includes a fluid pressure line connected to said bellows, a vertically movable resilient mounting, a fluid impeller carried by said mounting for forcing fluid through the fluid pressure line and into the bellows, and an element slidably carried by the mounting for moving the impeller upon movement of the mounting toward the element.

BURTON B. BURCKHALTER.

REFERENCES CITED

The following references are of record in the file of this patent:

UNITED STATES PATENTS

| Number | Name | Date |
|---|---|---|
| 721,827 | Okun | Mar. 3, 1903 |
| 1,008,201 | Schmucker | Nov. 7, 1911 |
| 1,735,529 | Dey | Nov. 12, 1929 |
| 1,811,019 | McKenney | June 23, 1931 |
| 2,115,547 | Aikman | Apr. 26, 1938 |